United States Patent [19]

Watanabe et al.

[11] 4,311,219
[45] Jan. 19, 1982

[54] CALIPER GUIDING MECHANISM FOR DISC BRAKE

[75] Inventors: Yushiyo Watanabe, Kuki; Toshihiko Kimura, Iwatsuki; Masayuki Kurata, Kuki, all of Japan

[73] Assignee: Akebono Brake Industry Co., Ltd., Tokyo, Japan

[21] Appl. No.: 92,844

[22] Filed: Nov. 9, 1979

[30] Foreign Application Priority Data

Nov. 16, 1978 [JP] Japan ............................. 53-141679
Nov. 17, 1978 [JP] Japan ............................. 53-141884
Nov. 17, 1978 [JP] Japan ............................. 53-141885

[51] Int. Cl.³ ........................................... F16D 55/02
[52] U.S. Cl. ............................... 188/71.8; 188/196 P
[58] Field of Search ............... 188/73.3, 71.8, 196 P, 188/91.7, 92.3

[56] References Cited

U.S. PATENT DOCUMENTS

| | | | |
|---|---|---|---|
| 3,762,522 | 10/1973 | Kirschling | 188/71.8 |
| 4,072,217 | 2/1978 | Inoue et al. | 188/73.3 |
| 4,082,167 | 4/1978 | Einchcombe et al. | 188/73.3 |
| 4,121,698 | 10/1978 | Baum | 188/73.3 |
| 4,162,721 | 7/1979 | Moriya | 188/73.3 |
| 4,171,035 | 10/1979 | Takaaki | 188/73.3 |
| 4,194,597 | 3/1980 | Evans et al. | 188/73.3 |

*Primary Examiner*—Joseph F. Peters, Jr.
*Assistant Examiner*—Ross Weaver
*Attorney, Agent, or Firm*—Toren, McGeady & Stanger

[57] ABSTRACT

An improvement on a caliper guiding mechanism for a disc brake in which an auxiliary slide pin is arranged to be slidable in metallic contact, instead of conventional elastic contact, in the same manner as a main slide pin to an extent corresponding to a distance of a gap normally existing between a disc and each of friction pads. The invented arrangement is such that there is no difference between these slide pins in resistance to caliper sliding movement to prevent uneven wear and dragging of the friction pads. Despite of the sliding arrangement, the auxiliary slide pin is capable of absorbing a certain degree of machining error or a change in the parallel relative positions of the sliding pins caused by a torque during brake application.

19 Claims, 8 Drawing Figures

CALIPER GUIDING MECHANISM FOR DISC BRAKE

BACKGROUND OF THE INVENTION

1. Field of the Invention

This invention relates to an improvement on a caliper guiding mechanism employed in a pin-slide type disc brake.

2. Description of the Prior Art

In a disc brake of this type, as disclosed by a U.S. Pat. No. 4,042,074 for example, a claiper which has a pair of confronting parts disposed on both sides of a disc is arranged to push one of the friction pads which are also disposed on both sides of the disc against one side of the disc by means of a hydraulic pressure operating mechanism disposed within one of the confronting parts of the caliper; then, the other of the confronting parts of the caliper is slided in the axial direction of the disc by a reaction to the pushing action; and then this sliding movement pushes the other friction pad disposed on the other side of the disc against this side of the disc. This sliding movement of the caliper is effected by a caliper guiding mechanism which comprises a pair of slide pins arranged in parallel with each other and interposed in between the caliper and a fixed support member disposed at the periphery of the disc.

The caliper guiding mechanism is arranged such that each slide pin is fixedly secured either to a support member or to a caliper member and the sliding movement of the caliper member is guided by sliding engagement of each of the slide pins with an opening provided either in the support member or in the caliper member. Generally, however, the sliding engagement of one slide pin is arranged in a different manner from that of the other slide pin according to their positions relative to the rotating direction of the disc. In other words, the slide pin which is located on the incoming side of the disc rotation during the forward movement of a vehicle is arranged to be in metallic contact with the above stated opening, because it receives a portion of a braking torque during brake application and also for the purpose of ensuring that the caliper slides in the correct direction. On the other hand, the slide pin which is located on the outgoing side of the disc rotation is arranged to be in auxiliary sliding contact with the above stated opening through an elastic matter such as a rubber bush that permits a certain degree of a relative movement in the radial direction to absorb deviation from a given distance between the pair of slide pins resulting from a machining error or a change in the parallel positions of these pins caused by a braking torque during brake application.

In the caliper guiding mechanism of the disc brake of the type having one of such slide pins (hereinafter will be called the main slide pin) arranged to be in metallic sliding contact and the other slide pin (hereinafter will be called the auxiliary slide pin) arranged to be in auxiliary sliding contact through an elastic bush, the difference between these slide pins in sliding resistance tends to cause uneven wear and dragging of the friction pads. The present invention is directed to the prevention of such uneven wear and dragging of the friction pads.

With the auxiliary slide pin arranged to be in slidable engagement through an elastic matter while the main slide pin is in metallic contact engagement, the sliding resistance of one slide pin is sometimes about 10 times as much as that of the other slide pin. Therefore, it has been difficult to ensure smooth sliding of the caliper on such a pair of slide pins.

SUMMARY OF THE INVENTION

It is a general object of this invention to provide an improvement on the caliper guiding mechanism in which the above stated problem of the conventional arrangement is solved with the auxiliary slide pin arranged to be slidable in metallic contact, in the same manner as the main slide pin, to an extent corresponding to a distance of a gap normally existing between a disc and each of friction pads, and yet the auxiliary slide pin is arranged to be still capable of absorbing a certain degree of a machining error in the radial direction thereof.

The above and futher objects, features and advantages of the invention will become apparent from the following description of embodiments thereof taken in connection with the accompanying drawings.

DETAILED DESCRIPTION OF THE PREFERRED EMBODIMENTS

Embodiment Example 1

Figure 1:
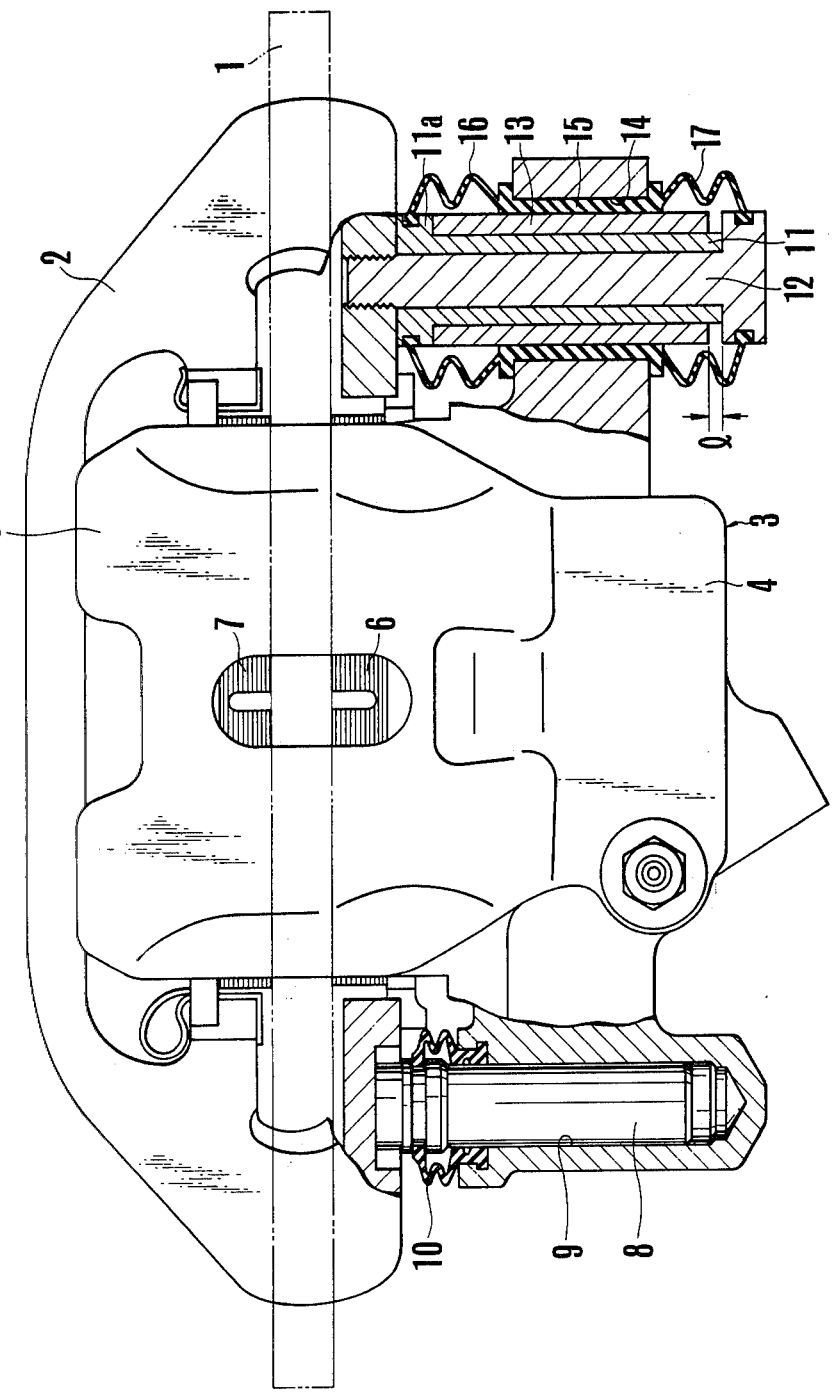
FIGS. 1 through 6 are partially sectional plan views showing disc brakes as first through sixth embodiments of the invention.

In FIG. 1 which shows the first embodiment example of the invention, a reference numeral 1 indicates a disc. A support 2 which is secured to a structural part of a vehicle is arranged at the periphery of the disc 1 with a vertical flat part thereof disposed in parallel with one rotating face of the disc 1 and a horizontal part which extends perpendicularly to the other rotating face on the opposite side of the disc 1 by straddling the periphery thereof. A caliper 3 is arranged to straddle the periphery of the disc 1. The caliper 3 is carried by left and right, main and auxiliary slide pins and is arranged to be slidable relative to the support 2 in the axial direction of the disc 1. Confronting parts 4 and 5 of the caliper 3 are disposed on both sides of the disc 1. A hydraulic pressure operating mechanism which is not shown but disposed within the caliper part 4 is arranged to push a friction pad 6 which is one of the pair of friction pads 6 and 7 against the disc 1. Then, a reaction to this pushing action causes the caliper 3 to slide to cause in turn the other caliper part 5 to push the other friction pad 7 against the disc 1.

The main slide pin 8 is secured by welding to a vertical flat face part of the support 2 and is slidably fitted without any play into a blind hold opening 9 formed in the caliper 3. A reference numeral 10 indicates a dust-proof boot. The auxiliary slide pin 11 has a bolt 12 arranged to pierce through the inside of its tubular form and is thus secured by the bolt 12 to the vertical flat face part of the support 2. A rigid metal sleeve 13 slidably engages with the outer circumference of the auxiliary slide pin 11. Between the metal ssleeve 13 and an opening 14 formed in the caliper 3, there is provided a rubber bush 15 which is secured to the opening 14. The rubber bush 15 is provided with dust-proof boots 16 and 17 which are formed into one unified body with the rubber bush 15. The end of the boot 16 is attached to the auxiliary slide pin 11 while the other boot 17 is attached to the boot 12.

Further, the rigid metal sleeve 13 is connected to the auxiliary slide pin 11 to be movable within a distance l in the axial direction thereof as shown in FIG. 1. This distance l is set at a value corresponding to a gap existing between the friction pad 7 and the disc 1 under a non-braking condition.

The caliper guiding mechanism described in the foregoing operates in the following manner: With the hydraulic operating mechanism operated to push the friction pad 6 against the disc 1, a reaction to the pushing action of the hydraulic operating mechanism causes the caliper to slide with the main and auxiliary slide pins serving to guide the caliper. Then, the confronting part 5 pushes the other friction pad 7 also against the disc 1 and a braking force is obtained with the pair of friction pads 6 and 7 thus pressing the disc 1 on both sides thereof. The sliding movement of the caliper 3 during brake application have a uniform, relatively small sliding resistance because both of the main and auxiliary slide pins are provided with metal sliding contact parts and the pin 11 is not in contact with the rubber bush 15. In other words, on the side of the auxiliary slide pin 11, the rigid auxiliary slide pin 11 is in contact with the inner circumferential face of the rigid sleeve 13 while the outer circumferential face of the rigid sleeve 13 is in contact with the rubber bush 15. The former contact of the auxiliary slide pin is a metallic contact having less sliding resistance than the latter sliding contact effected through the rubber bush 15. Thus, the metallic contact of the auxiliary slide pin has the same degree of sliding resistance as the sliding resistance on the side of the main slide pin. Accordingly, since the gap l shown in the drawing is located on the side of the free end of tthe auxiliary slide pin 11 under a nonbraking condition, the auxiliary slide pin 11 are slidable relative to the rigid sleeve 13.

When wear of linings of the friction pads 6 and 7 has come to cause the extent of the sliding movement of the caliper 3 to exceed the distance of the gap l, the sleeve 13 and the bolt 12 comes into contact with each other to have a sliding movement take place between the rubber bush 15 and the rigid sleeve 13.

When the caliper is brought back to its initial position by a deflecting movement of the disc 1 or by a caliper returning device, with the brake released, the rigid sleeve 13 is also caused to slide back together with the caliper 3 through the rubber bush 15 and, in the case of this embodiment, comes to a stop in a state as shown in FIG. 1 when it comes into contact with the flange part 11a of the auxiliary slide pin 11. Then, a further sliding movement of the caliper 3 is restricted by a relatively great sliding resistance due to the rubber bush 15 to preclude the problem of knock-back or the like. Further, in this embodiment, the rigid sleeve 13 is made of a metal. However, the invention is not limited to this and the rigid sleeve 13 may be made of a resin or other plastic material.

Furthermore, if rust is formed between the slide pin 11 and the sleeve 13 thereby restricting sliding movement therebetween, the caliper 3 can move slightly to return to the repose position due to the sliding motion between the sleeve 13 and the rubber bush 15 or due to elastic restoration of the rubber bush 15. Therefore, even under such circumstances, the friction pad is never dragged by the disc. Thus, the sliding motion between the sleeve 13 and the bush 15 is reversible.

Embodiment Example 2

Figure 2:
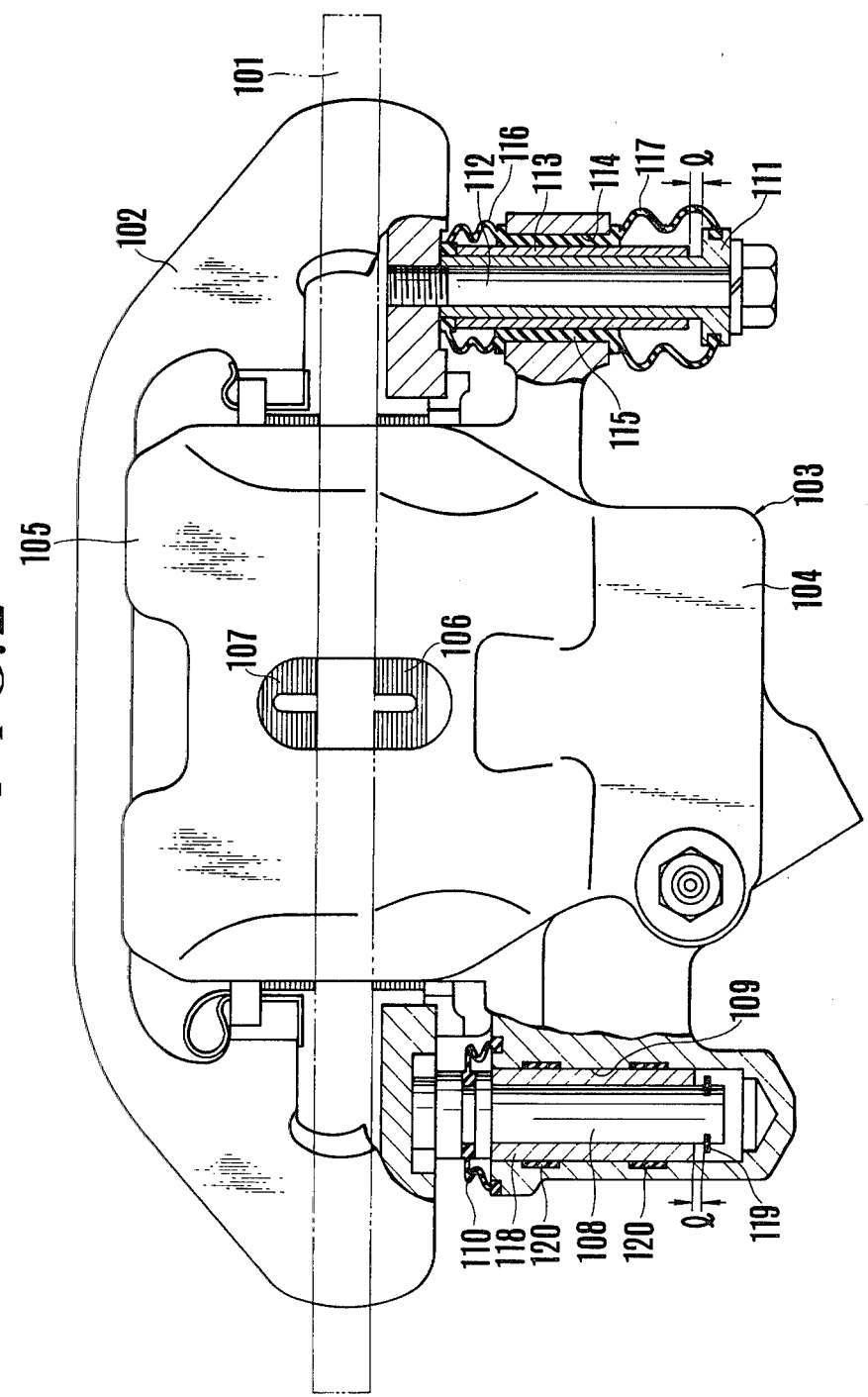

In this embodiment example, the auxiliary slide pin is arranged as shown in FIG. 2 in a manner similar to the arrangement of Embodiment Example 1. On the side of the main slide pin, the sliding resistance is arranged to vary with increase in the extent of the sliding movement of the caliper. In other words, the sliding resistance of the main sliding pin and that of the auxiliary slide pin are arranged to be balanced even when there is exerted a relatively great sliding resistance through an elastic matter with the linings of the friction pads having been worn away.

Referring to FIG. 2, the structural arrangement of this embodiment example comprises: A disc 101, a support 102, a caliper 103, confronting caliper parts 104 and 105, friction pads 107, a main slide pin 108, a blind hole opening 109, a dustproof boot 110, an auxiliary slide pin 111, a bolt 112, a rigid sleeve 113, an opening 114, a rubber bush 115 and dust-proof boots 116 and 117. In this embodiment, the main slide pin 108 is not slidably engages directly with the blind hole opening 109 but is arranged to slidably engage it through a rigid metal tubular member 118, which slidably engages with the blind hole opening 109 without play between them while there is provided a stopper 119 which has the tubular member 118 allow the main slide pin 108 a latitude of movement within the same distance l as the auxiliary slide pin 111. Between the tubular member 118 and the blind hole opening 109, there are inserted a pair of rubber rings 120. Further, the tubular member 118 may be made of a resin or other plastic material instead of a metal material. The illustration of FIG. 2 shows the embodiment as being in a non-braking condition.

With the embodiment arranged as described in the foregoing, the rigid sleeve 113 and the rigid tubular member 118 are normally arranged to allow the main and auxiliary slide pins 108 and 111 the latitude of movement within the distance l with their metallic contact sliding engagements giving only a slight degree of resistance to the sliding movement of the caliper respectively. However, when the extent of the sliding movement of the caliper 103 comes to exceed this distance l due to wear of the linings of the friction pads 106 and 107, both the main and auxiliary slide pins 108 and 111 come to have a relatively great sliding resistance because of the intervention of rubber.

Embodiment Example 3

Figure 3:
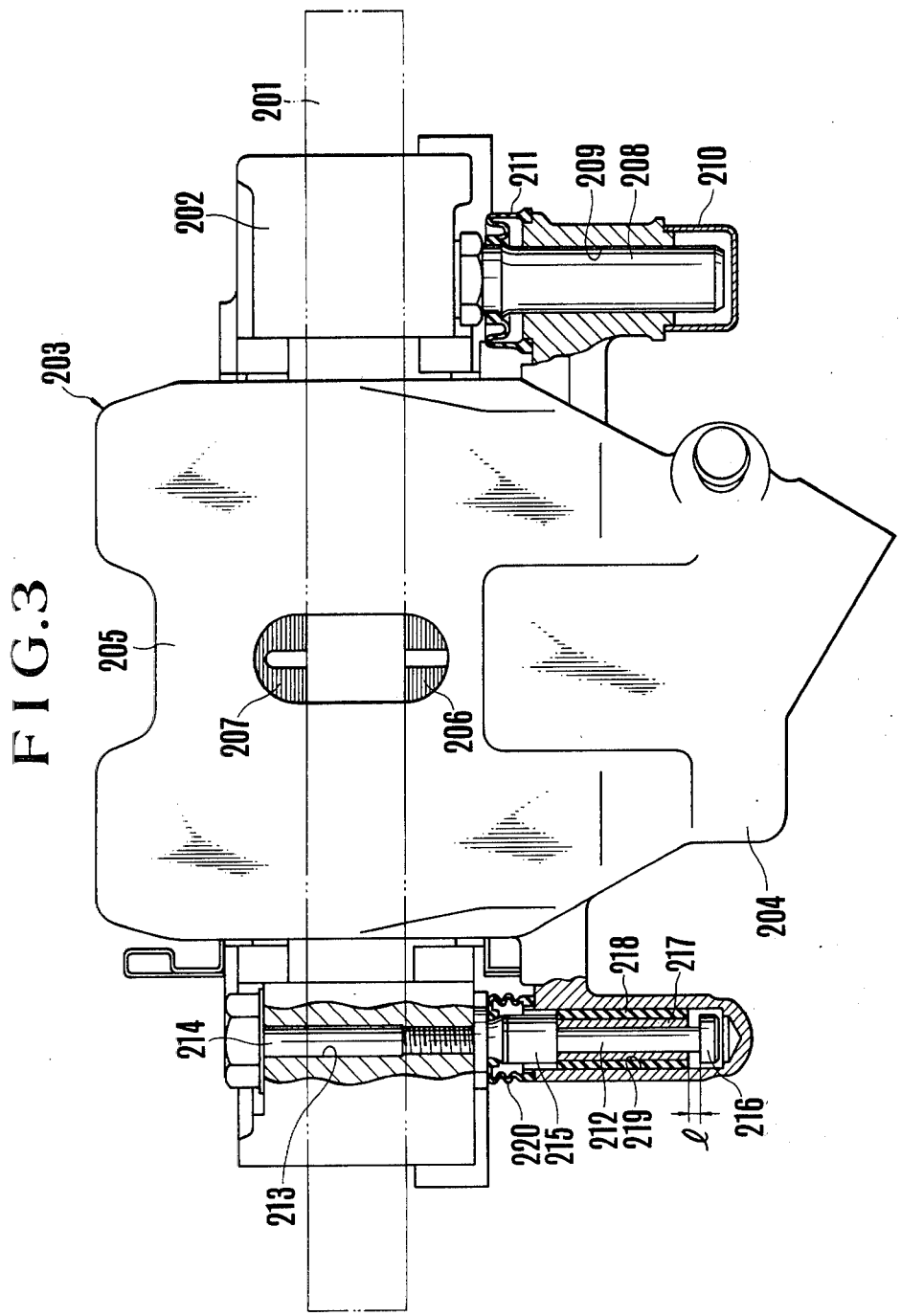

In FIG. 3 which shows the third embodiment example of the invention, a support 202 is secured to a structural part of a vehicle body and is arranged to carry a caliper 203 which is provided with a pair of mutually confronting parts 204 and 205 disposed with a disc 1 interposed in between them. The confronting parts 204 and 205 are provided with friction pads 206 and 207. A main slide pin 208 is secured to the support 202 and is arranged to be in slidable engagement directly with an opening 209 formed in the caliper 203. The sliding face of the main slide pin 208 is sealed by a cap 210. A dust-proof boot 211 is arranged to cover the edge portion of the opening 209 and that of the main slide pin 208. There is provided an auxiliary slide pin 212 which is secured to the support 202 by a bolt 214 inserted through a hole 213 piercing through the support 202. The auxiliary slide pin 212 is provided with a flange part 215 and a stopper 216 which is secured to the fore end of the auxiliary slide pin 212 by press-in connection. The auxiliary slide pin 212 is in a slidable engagement with a rigid sleeve 217. A rubber bush 218 which has about the same length as the rigid sleeve 217 is firmly attached to the outer circumference of the rigid sleeve 217. The rigid sleeve 217 is arranged to allow the auxiliary slide pin 212 a latitude of movement within a predetermined distance l of a gap provided between the flange part 215 and the stopper 216. The caliper 3 is provided with an opening 219 which opens at one end thereof and which is arranged to be in slidable engagement with the rubber bush 218. A reference numeral 220 indicates a dust-proof boot.

The operation and the advantage of the third embodiment example are about the same as the preceding embodiment example. Therefore, description of the operation and the advantage attainable by this embodiment is omitted.

Embodiment Example 4

Figure 4:
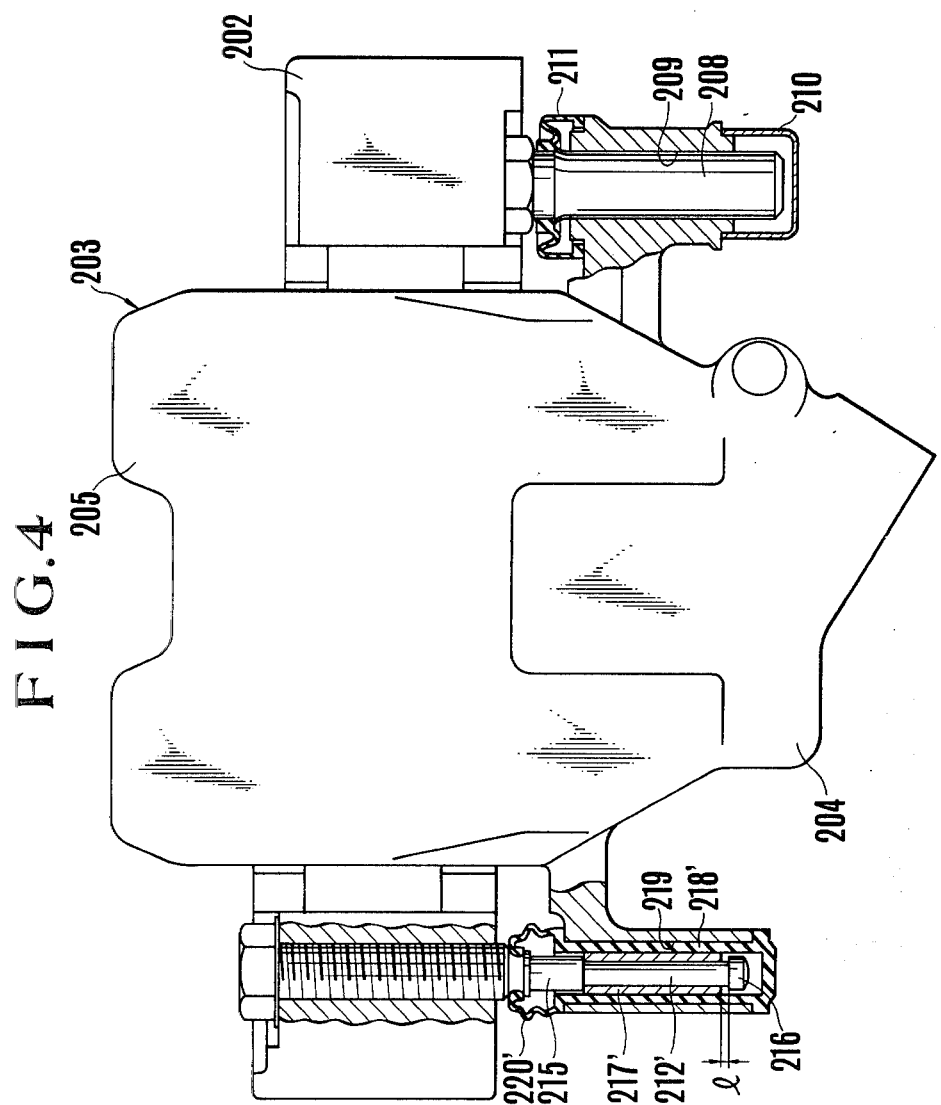

In FIG. 4 which shows the fourth embodiment example of the invention, the same parts as those used in Embodiment Example 3 are indicated by the same reference numerals as Embodiment Example 3. A rubber bush 218' has one end thereof closed and is secured to the opening 219 provided in the caliper 203. A boot 220' which is formed into one unified body with the rubber bush 218' is attached to an auxiliary slide pin 212' which is screwed to the support 202. Between the auxiliary slide pin 212' and the inner circumference of the bush 218', there is provided a rigid sleeve 217' which is allowed a latitude of movement in the axial direction within a distance l. When the caliper 203 comes to move to an extent exceeding this distance l during brake application, there takes place a sliding movement between the rubber bush 218' and the sleeve 217'.

Embodiment Example 5

Figure 5:
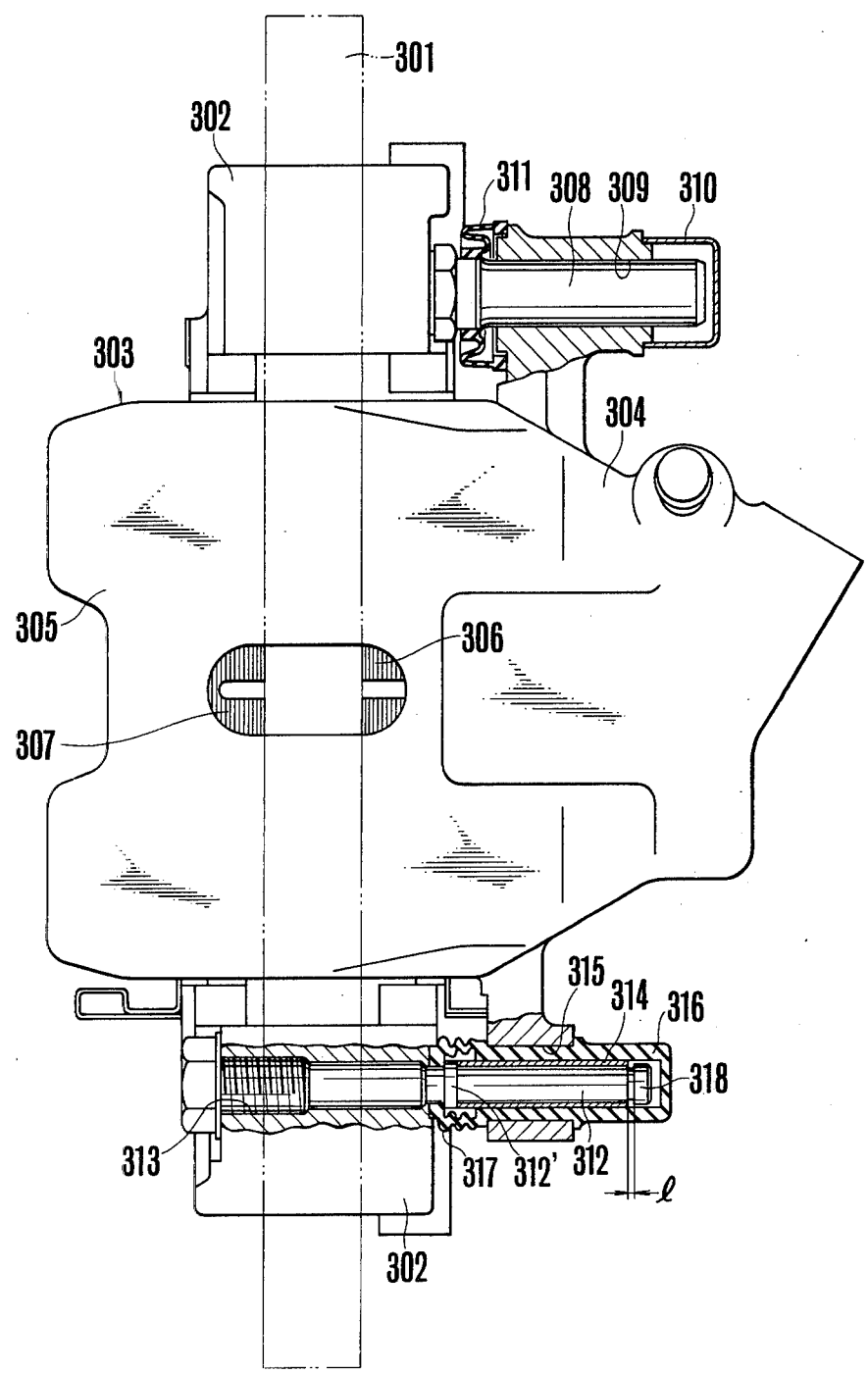

In FIG. 5 which shows the fifth embodiment example of the invention, a reference numeral 301 indicates a disc; 302 indicates a support; and 303 indicates a caliper which straddles a portion of the periphery of the disc 301. The caliper 303 is arranged to be guided and slided in the axial direction of the disc 301 by main and auxiliary slide pins 308 and 312. The caliper 303 is provided with mutually confronting parts 304 and 305. In the caliper part 304, there is provided a hydraulic operating mechanism which works to push a friction pad 306 against the disc 301. The other caliper part 305 is a reaction part which is caused by a sliding movement of the caliper 303 to push another friction pad 307 against the disc 301. There is provided a main slide pin 308 which is secured to the support 302 on the incoming side of the rotation of the disc 301 and is arranged to slidably engage with an opening 309 formed in the caliper 303 in rigid contact with the opening 309. The sliding contact face of the main slide pin 308 and that of the opening 309 are covered with a cap 310 and a dust-proof boot 311.

An auxiliary pin 312 is secured to the support 302 on the outgoing side of the rotation of the disc 301. This embodiment example is characterized by the structural arrangement of the auxiliary slide pin 312. The support is provided with a screw hole piercing through it in the axial direction of the disc 301. The fore end of the auxiliary slide pin 312 which slidably engages with and is in rigid contact with a rigid sleeve 314 of a smaller diameter than the screw hole 313 in such a way as to have a latitude of movement to a given extent in the axial direction thereof is inserted in the screw hole 313; and the auxiliary slide pin 312 is thus screwed to the support 302. The rigid sleeve 314 is then slidably inserted into a dust-proof boot/rubber bush 316 which has one end thereof open. The open end of the boot portion of the rubber bush 316 is arranged to be in fitted engagement with a circumferential groove 317 provided in the auxiliary slide pin 312. The stopper 318 which is secured by press-in connection to the fore end of the auxiliary slide pin 312 and is arranged to define the movable limit of the rigid sleeve 314 has its outer diameter arranged to be smaller than the inner diameter of the rubber bush 316; and both the stopper 318 and the flange part 312' which defines the movable limit of the rigid sleeve in the other direction are arranged to have their diameters small enough to permit insertion of them into the screw hole 313 of the support 312.

Such being the arrangement, after the main slide pin 308 is secured to the support 302 by means of a screw or the like, the assembling work on the caliper guiding mechanism is completed by mounting the auxiliary slide pin 312 with the rigid sleeve 314 connected thereto beforehand. Therefore, this structural arrangement facilitates replacing work on the friction pads 6 and 7.

Embodiment Example 6

Figure 6:
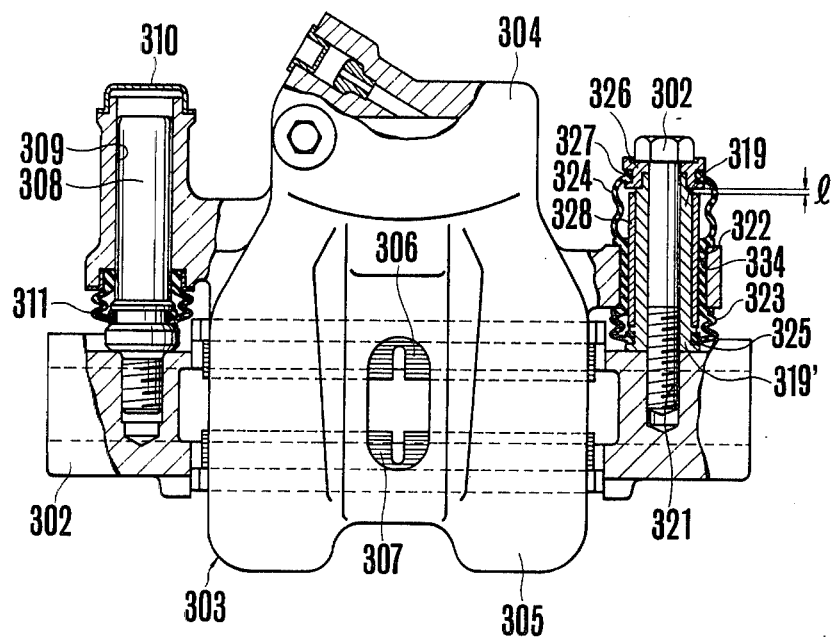

In FIG. 6 which shows the sixth embodiment example of the invention, the same parts as those used in the embodiment shown in FIG. 5 are indicated by the same reference numerals. An auxiliary slide pin 319 is formed in a tubular shape separately from a fixing bolt 320. The auxiliary slide pin is attached to the support 302 by firmly screwing the fixing bolt 320 to a screw hole 321 which is provided in the support 302. A rubber bush 322 is secured to an opening 334 provided in the caliper. The rubber bush 322 is provided with boot portions 323 and 324 which are arranged to extend from both ends of the rubber bush 322 and are respectively fitted into a circumferential groove 325 of the auxiliary slide pin 319 and a circumferential groove 327 of a stopper 326. Between the auxiliary slide pin 319 and the rubber bush 322, there is interposed a rigid sleeve 328, which is arranged to be movable relative to the auxiliary slide pin 319 in the axial direction thereof within a given distance determined jointly by a flange part 319' of the auxiliary slide pin 319 and the above stated stopper 326 in the same manner as in the preceding embodiment example. Further, a stopper ring 326 which is serving combined purposes of defining the movable limit for the rigid sleeve 328 and functioning as part required for fitting the boot is arranged to be fixed in place at the same time when the fixing bolt 320 which is used for securing the auxiliary slide pin 319 to the support 302 is connected to the screw hole of the support 302.

The embodiment which is arranged as described in the foregoing operates in about the same manner as the preceding embodiment example. The advantages of this embodiment lie in that: The friction pads 306 and 307 can be easily replaced by removing the fixing bolt 320 and by turning the caliper 303 on the slide pin 308; and inspecting and replacing work can be also very easily performed on the auxiliary slide pin 319 and the rigid sleeve 328.

Embodiment Example 7

Figure 7:
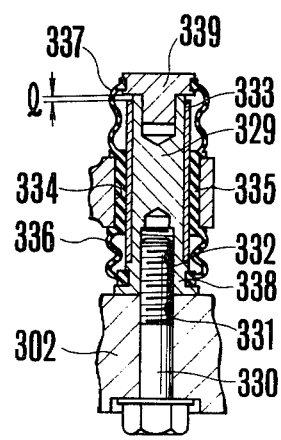
FIG. 7 is a sectional view showing a part of the seventh embodiment.

In FIG. 7 which shows the seventh embodiment example of the invention, a fixing bolt 330 which is provided for securing an auxiliary slide pin 329 to the support 302 is arranged to be inserted into a hole 331 piercing through the support 302 in the axial direction of the disc and to be screwed to a thread part 332 of the auxiliary slide pin 329. A flange part 338 of the auxiliary slide pin 329 and a stopper 339 secured by press-in connection to the fore end of the auxiliary slide pin 329 are arranged to define the movable limit of a rigid sleeve 333 and to permit fitting of the boot portions 336 and 337 of a rubber bush 335 extending from the rubber bush 335 which is secured to an opening 334 of the caliper.

Embodiment Example 8

Figure 8:
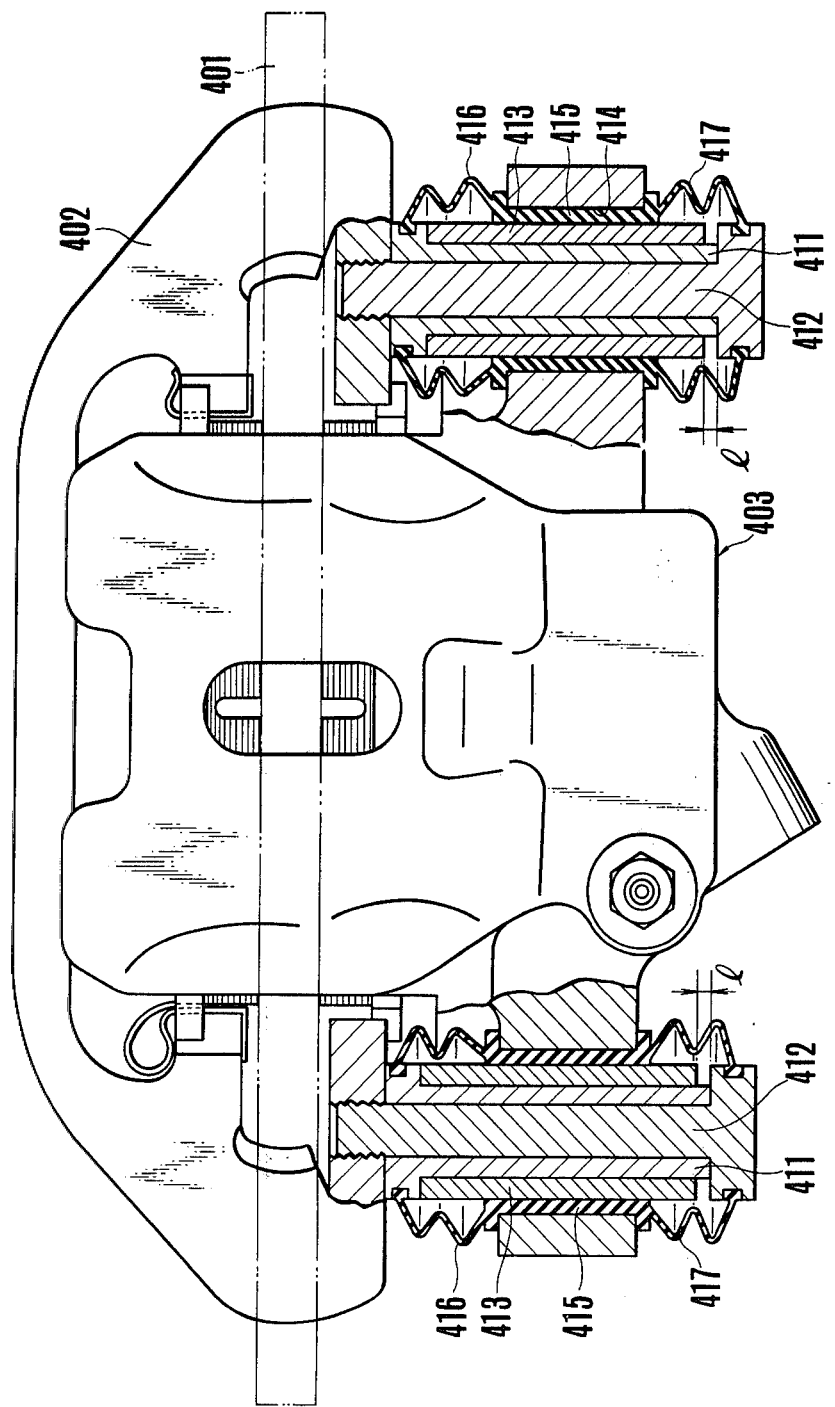
FIG. 8 is a partially sectional plan view showing a disc brake as the eighth embodiment of the invention.

In This embodiment of the invention which is shown in FIG. 8, the structural arrangement of a guiding mechanism for guiding a caliper 403 in the axial direction of a disc 401 comprises: Slide pins 411 each of which is secured to a support 402 by means of a bolt 412; a rigid sleeve 413 which is freely slidable on the slide pin 411 in the axial direction thereof within a given distance l; and a rubber bush 415 interposed in between the rigid sleeve 413 and an opening 414 provided in the caliper 403.

With the embodiment arranged in this manner, the sliding resistance to sliding movement of the caliper 403 within the moving distance l can be made less than the degree of resistance to movement which takes place through the rubber bush 403 though the caliper 403 is arranged to be resiliently held by the rubber bush 403 on each of the left and right sides thereof. Therefore, this arrangement precludes the possibility of dragging of the friction pads due to insufficient return of the caliper back to its brake releasing position.

As described in the foregoing, in a disc brake of the type having at least one of the main and auxiliary slide pins arranged to be in slidable engagement through an elastic matter with an opening provided in a caliper, the caliper guiding mechanism of the invention is characterized in that: The caliper has small, balanced sliding resistances both on the sides of the main and auxiliary slide pins when the caliper slides during brake application to an extent corresponding to a gap distance which is normally required between the disc and each of the friction pads to prevent the friction pad from dragging under a non-braking condition.

When the linings of the friction pads have worn, the structural arrangement on the side of the auxiliary slide pin is such that there is a relatively high sliding resistance through an elastic matter during brake application and yet the structural arrangement facilitates assembling and maintenance work. Therefore, the invention is highly advantageous.

What is claimed is:

1. In caliper guiding mechanisms employed to a disc brake having a caliper member which is arranged to push friction pads against a disc and is arranged to be guided by a support member in the axial direction of said disc and slide pins each of which is placed in an opening provided in one of said two members and is secured to the other member, at least one of said caliper guiding mechanisms characterized in that:

between said opening and said slide pin, there are provided a rigid sleeve and an annular elastic body which have their outer and inner circumferences arranged to be in fitted engagement with each other; and there are formed a first sliding part which is not included in said elastic body and which has a first sliding resistance and a second sliding part which is included in said elastic body and has a second sliding resistance which is greater than said first sliding resistance, said second sliding part being movable in two opposed directions relative to said rigid sleeve, with the amount of movement of said caliper member by the action of said first sliding part being restricted to a predetermined extent.

2. A caliper guiding mechanism according to claim 1, wherein said rigid sleeve is arranged to be movable within said predetermined extent l.

3. A caliper guiding mechanism according to claim 2, wherein said predetermined extent l corresponds to a brake clearance.

4. A caliper guiding mechanism according to claim 1, wherein said elastic body is a bush made of rubber.

5. A caliper guiding mechanism according to claim 4, wherein said elastic bush is secured to said opening with said rigid sleeve interposed in between said elastic bush and said slide pin.

6. A caliper guiding mechanism according to claim 5, wherein said first sliding part is formed between said rigid sleeve and said slide pin; and said second sliding part is formed between said rigid sleeve and said elastic bush.

7. A caliper guiding mechanism according to claim 5, wherein said slide pin is in a tubular shape and is secured to said the other member by means of a bolt which pierces through said tubular shape; and said slide pin and said bolt are arranged to restrict the movable extent of said rigid sleeve relative to said slide pin to said predetermined extent l.

8. A caliper guiding mechanism according to claim 7, wherein at both ends of said opening, there are provided a pair of boots which are arranged to be in one unified body with said elastic bush; one of said boots is attached to said bolt; and the other boot is attached to said slide pin, said boots being arranged to seal said first and second sliding portions from the exterior.

9. A caliper guiding mechanism according to claim 4, wherein said rigid sleeve is in fitted engagement with said slide pin; and said elastic bush which is disposed between said opening and said rigid sleeve is secured to said rigid sleeve.

10. A caliper guiding mechanism according to claim 9, wherein the movable extent of said rigid sleeve relative to said slide pin is restricted to said predetermined extent l by a pair of stopping means provided on said slide pin.

11. A caliper guiding mechanism according to claim 6, wherein the movable extent of said rigid sleeve relative to said slide pin is restricted to said predetermined extent l by a pair of stopping means provided on said slide pin.

12. A caliper guiding mechanism according to claim 11, wherein said slide pin is secured to said the other member with said slide pin piercing through a mounting hole provided in said the other member; and said pair of stopping means are arranged to be of a size passable through said mounting hole; and the outer diameter of said rigid sleeve is smaller than the diameter of said mounting hole.

13. A caliper guiding mechanism according to claim 6, wherein said slide pin is in a tubular shape and is secured to said the other member, together with a stopper ring engaging with one end of said slide pin, by a bolt which pierces through the inside of said tubular shape; and said stopper ring and said slide pin are arranged to restrict the movable extent of said rigid sleeve relative to said slide pin to the predetermined extent l.

14. A caliper guiding mechanismm according to claim 13, wherein at both ends of said opening there are provided a pair of sealing boots which are formed into one unified body with said elastic bush; one of said boots is attached to said slide pin; and the other boot is attached to said stopper ring, said boots being arranged to seal said first and second sliding portions from the exterior.

15. A caliper guiding mechanism according to claim 6, wherein said slide pin is secured to said the other member with said slide pin arranged to be in screwed engagement with a bolt which pierces through a mounting hole of said the other member; and the movable extent of said rigid sleeve relative to said slide pin is restricted to said predetermined extent l by a pair of stopping means provided on said slide pin.

16. A caliper guiding mechanism according to claim 15, wherein, at both ends of said opening, there are provided a pair of sealing boots which are formed into one unified body with said elastic bush; and said pair of boots are respectively connected to said pair of stopping means.

17. A caliper guiding mechanism according to claim 1, wherein another slide pin which is independent of said slide pin is secured to one of said two members; another opening which is independent of said opening is provided in the other of said two members; and said another slide pin is fitted into said another opening without leaving any play between them.

18. A caliper guiding mechanism according to claim 1, wherein another slide pin which is independent of said slide pin is secured to one of said two members; another opening which is independent of said opening is provided in the other of said two members; between said another slide pin and said another opening, there is interposed without play a rigid tubular member with the movable extent of said rigid tubular member relative to said another slide pin being restricted to a predetermined extent l; and, between said tubular member and said another opening, there is disposed an annular elastic body.

19. A disc brake assembly comprising: a brake disc; friction pads arranged to engage said brake disc to effect braking action; a caliper member and a support member arranged to operably support said friction pads on opposite sides of said disc; and a plurality of caliper guiding mechanisms movably supporting said caliper member and said support member relative to each other, at least one of said caliper guiding mechanisms comprising means affixed to one of said caliper member and support member defining a generally cylindrical elongated opening, a slide pin affixed to the other of said caliper member and support member mounted within said opening for sliding movement relative thereto, a resilient annular member interposed between said means defining said opening and said slide pin, a rigid sleeve interposed between said slide pin and said resilient annular member, means on said slide pin defining a rigid surface in sliding engagement with said rigid sleeve with a first frictional resistance, said rigid sleeve being in sliding engagement with said resilient annular member so as to be movable in two opposed directions relative thereto with a second frictional resistance, said second frictional resistance being greater than said first frictional resistance, and means limiting the amount of movement between said slide pin and said rigid sleeve to a predetermined amount.

* * * * *